United States Patent
Pakrooh et al.

(10) Patent No.: US 12,463,681 B2
(45) Date of Patent: Nov. 4, 2025

(54) NARROWBAND ASSISTED ULTRAWIDEBAND FREQUENCY HOPPING

(71) Applicant: QUALCOMM Incorporated, San Diego, CA (US)

(72) Inventors: Pooria Pakrooh, San Diego, CA (US); Bin Tian, San Diego, CA (US); Le Nguyen Luong, San Diego, CA (US); Koorosh Akhavan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 18/463,003

(22) Filed: Sep. 7, 2023

(65) Prior Publication Data

US 2024/0088938 A1 Mar. 14, 2024

Related U.S. Application Data

(60) Provisional application No. 63/375,482, filed on Sep. 13, 2022.

(51) Int. Cl.
*H04B 1/7156* (2011.01)
*H04L 5/00* (2006.01)

(52) U.S. Cl.
CPC ......... *H04B 1/7156* (2013.01); *H04L 5/0007* (2013.01); *H04L 5/006* (2013.01)

(58) Field of Classification Search
CPC . H04W 56/002; H04W 74/0808; H04W 4/80; H04L 5/0007; H04L 5/006;
(Continued)

(56) References Cited

U.S. PATENT DOCUMENTS

2012/0127865 A1 5/2012 Nakae et al.
2018/0131547 A1* 5/2018 Wang .................. H04L 27/2602
(Continued)

FOREIGN PATENT DOCUMENTS

EP 1118166 A1 7/2001

OTHER PUBLICATIONS

Bin Tian, Pooria Pakrooh and Koorosh Akhavan, Discussion on narrowband assisted UWB, IEEE 802.15-22-0156-00-04ab, Mar. 8, 2022 (Year: 2022).*
(Continued)

*Primary Examiner* — Aristocratis Fotakis
(74) *Attorney, Agent, or Firm* — Harrity & Harrity LLP

(57) ABSTRACT

Aspects of the present disclosure generally relate to wireless communication. In some aspects, a first wireless communication device (WCD) may transmit, to a second wireless communication device, a first synchronization message using a first radio frequency (RF) technology and a first frequency resource, the first synchronization message associated with synchronization for a second RF technology. The first WCD may transmit, to the second WCD and after switching to a second frequency resource, a second synchronization message using the first RF technology, the second synchronization message associated with synchronization for the second RF technology, and the switching to the second frequency resource based at least in part on one or more of: transmission of the second synchronization message being associated with ranging or sensing, or failure of the first synchronization message or failure of a reply, from the second WCD, to the first synchronization message. Various other aspects are described.

20 Claims, 9 Drawing Sheets

(58) Field of Classification Search
CPC ............... H04B 1/7183; H04B 1/7156; H04B 2201/71634; H04B 1/713; H01Q 5/25
See application file for complete search history.

(56) References Cited

U.S. PATENT DOCUMENTS

| | | | |
|---|---|---|---|
| 2020/0187265 A1* | 6/2020 | Luo | H04J 13/10 |
| 2021/0400441 A1* | 12/2021 | Burowski | G01S 3/50 |
| 2022/0066010 A1* | 3/2022 | Henry | G01S 5/145 |
| 2022/0137177 A1* | 5/2022 | Hammerschmidt | G01S 13/003 |
| | | | 455/456.1 |
| 2022/0141657 A1* | 5/2022 | Hammerschmidt | |
| | | | H04L 25/0224 |
| | | | 726/3 |
| 2022/0416989 A1* | 12/2022 | Lee | H04W 48/10 |
| 2025/0024424 A1* | 1/2025 | Liu | H04W 64/003 |

OTHER PUBLICATIONS

J.S. Hammerschmidt, Ersen Ekrem, Eren Sasoglu, Xiliang Luo, Narrowband assisted multi millisecond UWB, IEEE 802.15-21-0409-00-04ab, Apple, Jul. 20, 2021 (Year: 2021).*

Alexander Krebs, Yong Liu, Lochan Verma, Jinjing Jiang, SK Yong, Narrowband Channel Access and Interference Mitigation for NBA-MMS-UWB, IEEE 802.15-22-0340-00-04ab, Apple, Jul. 6, 2022 (Year: 2022).*

Ersen Ekrem, Ido Bettesh, and Moche Cohen, More on narrowband assisted multi-millisecond UWB, IEEE 802.15-21-0593-00-04ab, Apple, Nov. 12, 2021 (Year: 2021).*

Bin Tian, Pooria Pakrooh and Koorosh Akhavan (Qualcomm), Jonathan Segev (Intel), Coexistence discussion on narrowband assisted UWB, IEEE 802.15-22-0261-00-04ab, May 10, 2022 (Year: 2022).*

International Search Report and Written Opinion—PCT/US2023/073756—ISA/EPO—Jan. 2, 2024.

* cited by examiner

NARROWBAND ASSISTED ULTRAWIDEBAND FREQUENCY HOPPING

CROSS-REFERENCE TO RELATED APPLICATION

This Patent Application claims priority to U.S. Provisional Patent Application No. 63/375,482, filed on Sep. 13, 2022, entitled "NARROWBAND ASSISTED ULTRAWIDEBAND FREQUENCY HOPPING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for narrowband assisted ultrawideband frequency hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, among other examples). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first wireless communication device. The method may include transmitting, to a second wireless communication device, a first synchronization message using a first radio frequency (RF) technology and a first frequency resource, the first synchronization message associated with synchronization for a second RF technology. The method may include transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of, transmission of the second synchronization message being within a slot, round, or block associated with ranging or sensing, or failure of the first synchronization message or failure of a reply, from the second wireless communication device, to the first synchronization message.

Some aspects described herein relate to a first wireless communication device for wireless communication. The first wireless communication device may include one or more memories and one or more processors coupled to the memory. The one or more processors may be configured, individually or collectively, to transmit, to a second wireless communication device, a first synchronization message using a first RF technology and a first frequency resource, the first synchronization message associated with synchronization for a second RF technology. The one or more processors may be configured, individually or collectively, to transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of transmission of the second synchronization message being within a slot, round, or block associated with ranging or sensing, or failure of the first synchronization message or failure of a reply, from the second wireless communication device, to the first synchronization message.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, a first synchronization message using a first RF technology and a first frequency resource, the first synchronization message associated with synchronization for a second RF technology. The set of instructions, when executed by one or more processors of the first wireless communication device, may cause the first wireless communication device to transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of transmission of the second synchronization message being within a slot, round, or block associated with ranging or sensing, or failure of the first synchronization message or failure of a reply, from the second wireless communication device, to the first synchronization message.

Some aspects described herein relate to an apparatus for wireless communication. The apparatus may include means for transmitting, to a second wireless communication device, a first synchronization message using a first RF technology and a first frequency resource, the first synchronization message associated with synchronization for a second RF technology. The apparatus may include means for transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of, transmission of the second synchronization message being within a slot, round, or block associated with ranging or sensing, or failure of the first synchronization message or failure of a reply, from the second wireless communication device, to the first synchronization message.

Aspects generally include a method, apparatus, system, computer program product, non-transitory computer-readable medium, user equipment, base station, network entity, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
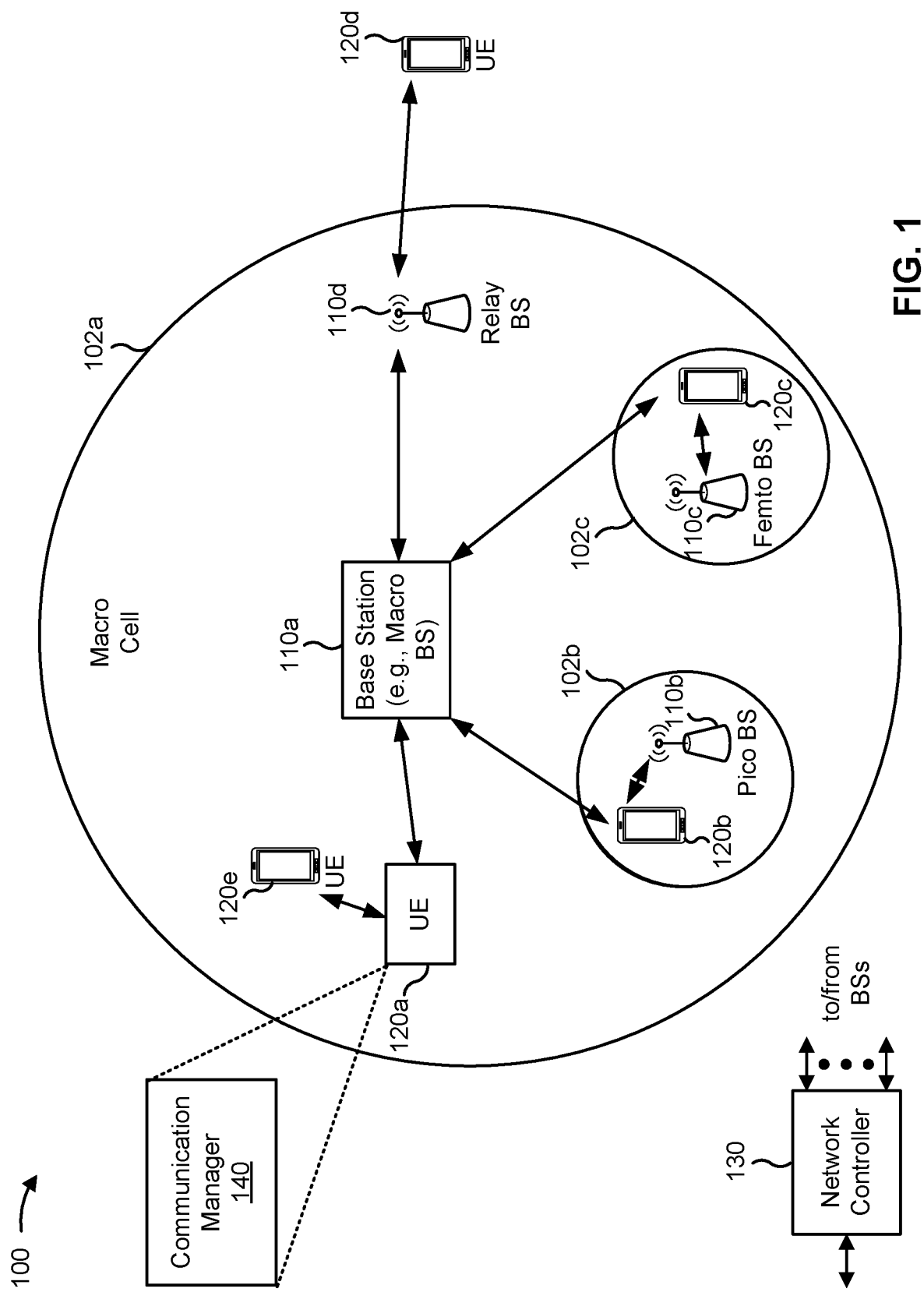
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, among other examples.

The wireless network 100 may be a heterogeneous network that includes network nodes 110 of different types, such as macro network nodes, pico network nodes, femto network nodes, relay network nodes, among other examples. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memories) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, among other examples. A frequency may be referred to as a carrier, a frequency channel, among other examples. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, among other examples. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the first wireless communication device described herein may correspond to the UE 120 or the network node 110 and/or may be associated with the UE 120. In some aspects, the first wireless communication device may include a communication manager 140. As described in more detail elsewhere herein, the communication manager 140 or 150 may transmit, to a second wireless communication device, a first synchronization message using a first radio frequency (RF) technology and a first frequency resource, the first synchronization message associated with synchronization for a second RF technology; and transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of: transmission of the second synchronization message being within a slot, round, or block associated with ranging or sensing, or failure of the first synchronization message or failure of a reply, from the second wireless communication device, to the first synchronization message. Additionally, or alternatively, the communication manager 140 or 150 may perform one or more other operations described herein.

As indicated above, FIG. 1 is provided as an example. Other examples may differ from what is described with regard to FIG. 1.

Figure 2:
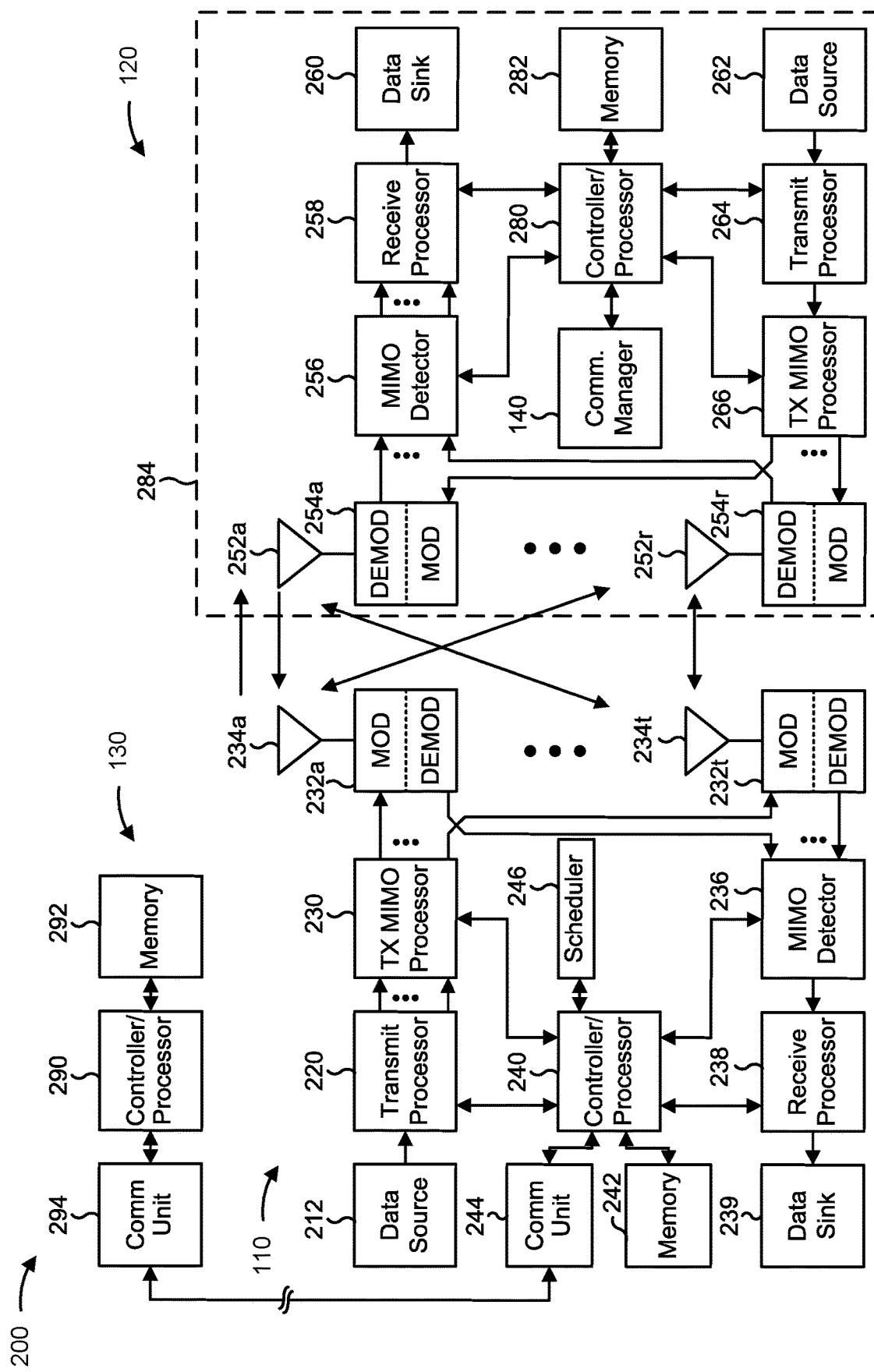
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and one or more memories 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the network node 110, the controller/processor 280 of the UE 120, and/or any other component(s) of FIG. 2 may perform one or more techniques associated with narrowband assisted ultrawideband frequency hopping, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the first wireless communication device includes means for transmitting, to a second wireless communication device, a first synchronization message using a first RF technology and a first frequency resource, the first synchronization message associated with synchronization for a second RF technology; and/or means for transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of: transmission of the second synchronization message being within a slot, round, or block associated with ranging or sensing, or failure of the first synchronization message or failure of a reply, from the second wireless communication device, to the first synchronization message.

In some aspects, the means for the first wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, memory 282, an ultrawideband transceiver 305 described in connection with FIG. 3, narrowband transceiver 320 described in connection with FIG. 3, and/or processor 335 described in connection with FIG. 3.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
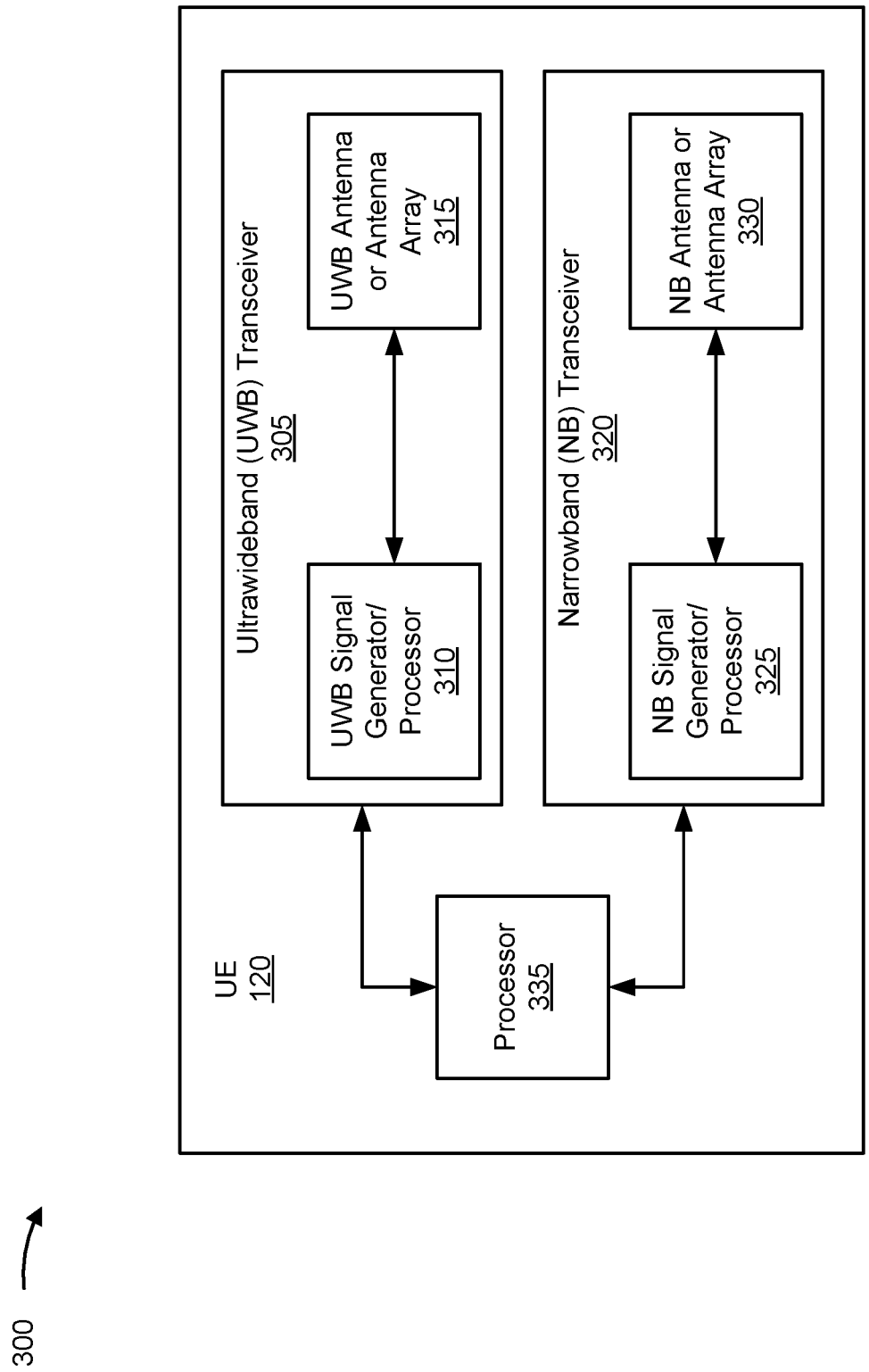
FIG. 3 is a diagram illustrating an example of radio frequency (RF) components of a UE, in accordance with the present disclosure.

FIG. 3 is a diagram illustrating an example 300 of RF components of a UE 120, in accordance with the present disclosure. Although aspects of FIG. 3 are described in the context of a UE 120 for convenience, aspects of the disclosure are not so limited. In other aspects, certain features and components of the UE 120 described in connection with FIG. 3 may be incorporated into another wireless communication device (e.g., a UWB device) without departing from the scope of the disclosure.

In some cases, a UE 120 may be equipped with multiple transceivers capable of operating various RF technologies. For example, in addition to the transceiver components described in connection with FIG. 2 (which, in some cases, may be used to communicate over a wireless network 100, as described), the UE 120 may be equipped with additional transceivers or similar components, such as transceivers associated with short-range wireless communication technologies, among other examples. Short-range wireless communication enables wireless communication over relatively short distances (e.g., within 30 meters). Bluetooth protocols are an example of a wireless technology standard for exchanging data over short distances using short-wavelength ultra high frequency (UHF) radio waves from 2.4 gigahertz (GHz) to 2.485 GHz. Bluetooth Low Energy (BLE) protocol is for communication with devices running on low power. Various other short-range wireless communication technologies may operate in a similar wavelength, such as wireless local area network (WLAN) technologies, Zigbee, and ultrawideband (UWB) technologies, which are described in more detail below. In some aspects, certain technologies such as Bluetooth, BLE, WLAN, Zigbee, among other examples may operate using a relatively narrow frequency band as compared to UWB technologies, and thus may collectively be referred to as narrowband (NB) technologies.

As shown in FIG. 3, in some cases the UE 120 may include components for communicating using one or more short-range wireless communication technologies. For example, the UE 120 may include a UWB component, such as the UWB transceiver 305 shown in FIG. 3, or related components. In some cases, the UWB transceiver 305 may include various components enabling UWB communication, such as a UWB signal generator/processor 310 and/or a UWB antenna or antenna array 315. As shown, the UWB signal generator/processor 310 and the UWB antenna or antenna array 315 may be in communication with one another (for example, via one or more buses and/or one or more other components).

One or more of the UWB transceiver 305, the UWB signal generator/processor 310, and the UWB antenna or antenna array 315 may enable UWB connectivity. UWB connectivity is a short-range, wireless communication protocol that operates with a very high frequency as compared to other short-range wireless communication technologies (e.g., Bluetooth, WLAN, Zigbee, among other examples) and uses a relatively wide frequency band (e.g., 500 MHz or greater) as compared to other short-range wireless communication technologies, which makes UWB useable for high-resolution positioning and localization purposes. In some cases, UWB technology may be used for location discovery, device ranging, among other examples. In some cases, a UWB transmitter (e.g., the UWB transceiver 305) may transmit numerous pulses across the wide spectrum frequency, and a corresponding UWB receiver (e.g., a UWB transceiver 305 located at another UWB-enabled device) may translate the pulses into data by listening for a familiar pulse sequence sent by the transmitter.

When multiple UWB devices are near one another (e.g., when two UEs 120 including UWB components such as the UWB transceiver 305 are near one another), the two UWB devices may start ranging, or measuring, a distance from one another. In such cases, the first UWB device (e.g., a UWB which first transmits a UWB communication, sometimes referred to as a ranging measurement signal and/or a UWB measurement signal) may be referred to as an initiator, and the second UWB device may be referred to as a responder. In some cases, measuring a distance between two UWB devices may be referred to as two-way ranging (TWR), because the measurements rely on two-way communication between the two UWB devices. More particularly, in TWR, an initiator and a responder may measure a distance between each other using time of flight (TOF) measurements or the like, such as by multiplying the round trip time of the signal by the speed of light and dividing by two. In some aspects, UWB devices may be able to determine the relative position of peer devices with a line of sight up to 200 meters, or similar distances. In some aspects, a UWB device may be capable of two-dimensional or three-dimensional location by additionally measuring a distance between the UWB device and a fixed beacon or anchor and then using triangulation. In some cases, "TWR" may refer to single-sided TWR or double-sided TWR. "Single-sided TWR" may refer to TWR based on two messages or sets of messages transmitted between an initiator and a responder (e.g., a poll message or set of poll messages sent from the initiator to the responder, and an answer message or set of answer messages sent from the responder to the initiator), while "double-sided TWR" may refer to TWR based on three or more messages or sets of messages transmitted between an initiator and a responder (e.g., the poll and answer messages described above, in addition to a final message or set of final messages sent from the initiator to the responder, and, optionally, a report message or set of report messages sent from the responder to the initiator).

Returning to FIG. 3, the UE 120 may include additional transceivers or components, such as additional transceivers associated with a different short-range wireless communication protocol. For example, the UE 120 may include an NB component, such as the NB transceiver 320 shown in FIG. 3, or related components. In some cases, the NB transceiver 320 may include various components enabling NB connectivity, such as an NB signal generator/processor 325 and/or an NB antenna or antenna array 330. As shown, the NB signal generator/processor 325 and the NB antenna or antenna array 330 may be in communication with one another. In some cases, the NB transceiver 320 and/or other NB components of the UE 120 may be associated with one or more of Bluetooth connectivity, BLE connectivity, WLAN connectivity, Zigbee connectivity, among other examples, which may use a relatively narrow frequency band as compared to UWB connectivity and/or which may operate in a relatively low frequency range as compared to UWB connectivity.

In some cases, the UWB components (e.g., the UWB transceiver 305) and/or the NB components (e.g., the NB transceiver 320) may communicate with one another or otherwise coexist with one another. For example, in some cases, the UWB transceiver 305 and/or the NB transceiver 320 may be connected to a processor 335. The processor 335 may control certain functions of the UWB transceiver 305 and/or the NB transceiver 320, including, in some cases, operating the UWB transceiver 305 and/or the NB transceiver 320 in conjunction with one another. For example, in some cases, the processor 335 may control the UWB transceiver 305 and/or the NB transceiver 320 for purposes of performing NB-assisted (NBA) UWB (NBA-UWB) technologies, such as the NBA-UWB technologies described below.

As indicated above, FIG. 3 is provided as an example. Other examples may differ from what is described with regard to FIG. 3.

Figure 4:
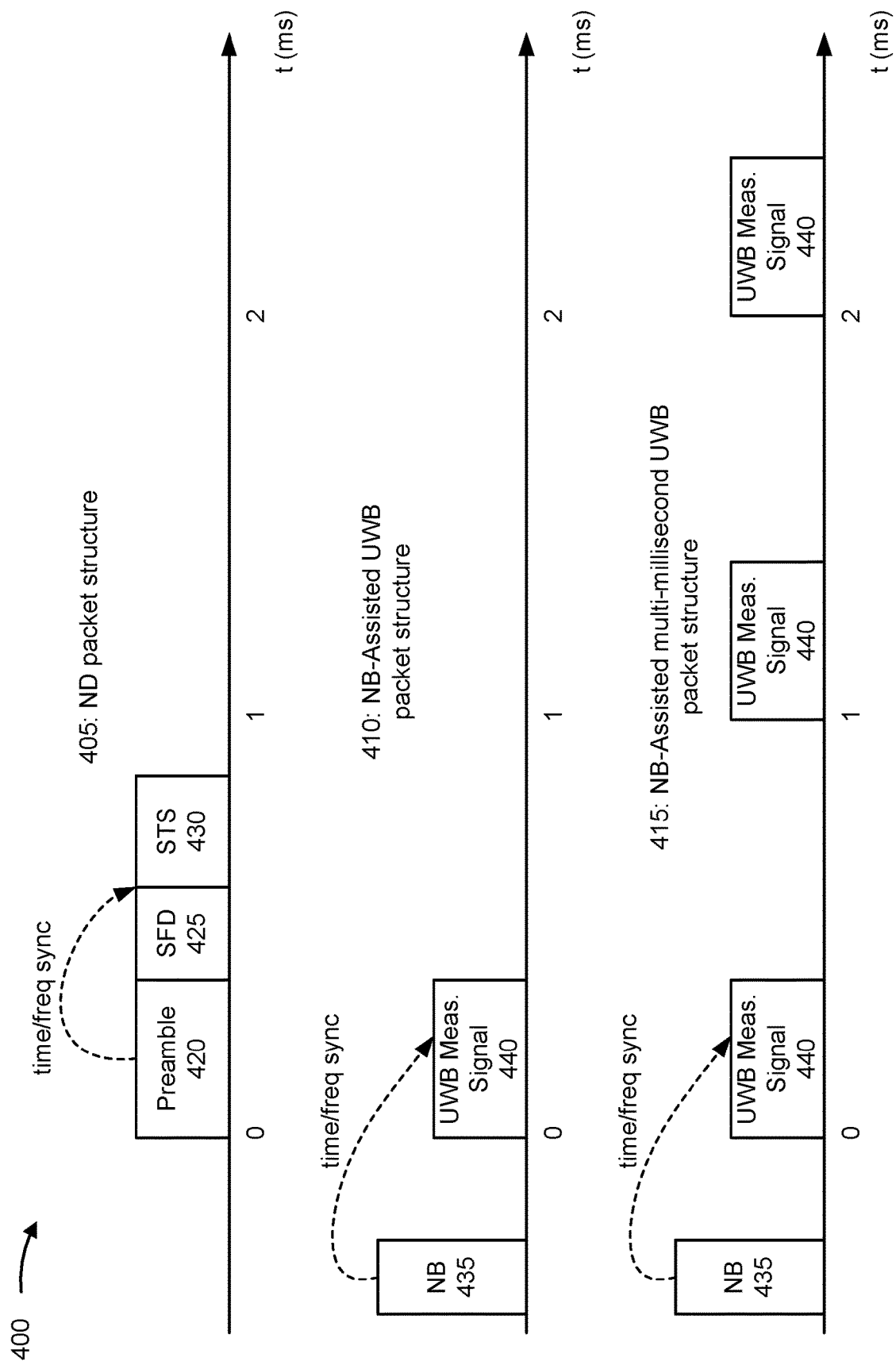
FIG. 4 is a diagram illustrating an example of ultra-wideband (UWB) packet structures, as well as multi-millisecond narrow band (NB) assisted UWB packet structure in accordance with the present disclosure.

FIG. 4 is a diagram illustrating an example 400 of UWB packet structures, as well as multi-millisecond NB assisted UWB packet structure in accordance with the present disclosure.

As described in connection with FIG. 4, in some cases, UEs 120 or other UWB devices may transmit UWB packets between each other with the aim to estimate the range (or distance) between the devices, or for other purposes such as to estimate the angular direction under which the stations appear with respect to each other. UEs 120 or other UWB devices may also transmit UWB packets to exchange payload data between each other.

As with many other wireless communication systems (e.g., WLAN, Bluetooth, or cellular services), UWB transmissions adhere to certain physical layer (PHY) frame formats, or packet formats (the terms "packet" and "frame" are used interchangeably herein). FIG. 4 illustrates example packet formats for use in UWB transmissions. More particularly, UWB devices may use a no-data (ND) packet structure, as shown by reference number 405, an NBA-UWB packet structure, as shown by reference number 410, an NBA multi-millisecond UWB packet structure, as shown by reference number 415, or other similar packet structures.

The ND packet structure may include a preamble 420, a start of frame delimiter (SFD) 425, and/or a scrambled timestamp sequence (STS) 430. In some aspects, the ND packet structure may be used to synchronize time and/or frequency between two UWB devices. For example, a first UWB device (e.g., an initiator) may transmit the ND packet, and another UWB device (e.g., a responder) may listen for the preamble 420. Once the preamble 420 is detected, the responder may listen for the SFD 425. The responder may use the SFD 425 to acquire frame timing. For example, the UWB packet may be transmitted by the initiator UWB at time 0, and thus the responder UWB device may timestamp the arrival of the UWB packet (e.g., the arrival of the preamble 420 and/or the SFD 425) as time 0. Moreover, the responder may listen for the STS 430, which in some cases may be used for purposes of channel estimation and/or time-stamp validation for secure TOF based range estimation, among other examples. In some cases, the preamble 420 may alternatively be referred to as a ranging preamble or a synchronization component (SYNC), and/or the preamble 420 and the SFD 425 (and optionally the STS 430, if equipped) may collectively be referred to as synchronization header (SHR). By receiving the preamble 420, the SFD 425, or/or the STS 430, a responder UWB device may synchronize time and/or frequency with an initiator UWB device, and thus receive UWB transmissions (e.g., preambles 420) for purposes of TWR, or for other purposes.

In other cases, one or more UWB devices may be synchronized according to another RF technology, such as an NB technology. In some cases, this may be referred to as NBA-UWB. Reference number 410 indicates an example of an NBA-UWB packet structure. In this example, an NB packet 435 provides the time and/or frequency synchronization information for a UWB packet, such as for a UWB measurement signal 440 (e.g., a UWB preamble or a similar measurement signal). More particularly, an NB component associated with the initiator device (e.g., the NB transceiver 320 described in connection with FIG. 3) may transmit the NB packet 435, which in some cases may be used to provide initial time and/or frequency synchronization for a subsequent UWB transmission. As shown in FIG. 4, in some cases, the initiator may transmit the NB packet 435 prior to time 0, and then subsequently transmit the UWB measurement signal 440 (which, in some cases, may be just a ranging preamble (e.g., preamble 420) without an SFD 425 and/or an STS 430) at time 0. A responder UWB device may receive the NB packet 435 and synchronize time and/or frequency accordingly in order to properly receive the UWB measurement signal 440 at time 0. Time and frequency can be further synchronized using the UWB communication.

In other cases, multiple UWB transmissions may be synchronized and/or scheduled according to another RF technology, such as an NB technology. For example, in some cases, an NB packet 435 may synchronize and/or schedule multiple UWB transmissions that span more than one millisecond, and thus may be referred to as NBA multi-millisecond UWB. Reference number 415 indicates an example of an NBA multi-millisecond UWB packet structure. In this example, an NB packet 435 provides the time and/or frequency synchronization information for multiple UWB packets, such as multiple UWB measurement signal 440 transmissions. More particularly, an NB component associated with the initiator device (e.g., the NB transceiver 320 described in connection with FIG. 3) may transmit the NB packet 435, which in some cases may include time and/or frequency synchronization information for multiple subsequent UWB transmissions. Put another way, the NB component shares the clock source with the UWB component. In some cases, this initial synchronization process (e.g., setting up and providing initial timing and frequency synchronization for UWB measurements) may be referred to as Phase I or Phase 1.

As shown in FIG. 4, the initiator may transmit the NB packet 435 prior to time 0, and then subsequently transmit a first UWB measurement signal 440 (which, in some cases, may be just a preamble 420 without an SFD 425 and/or an STS 430) at time 0. The initiator UWB may transmit additional packets (e.g., UWB measurement signals 440) a given time period apart, such that a UWB measurement may be performed over a longer duration than for the structures described in connection with reference numbers 405 and 410 (e.g., multiple milliseconds). In some cases, each UWB packet and/or transmission may be referred to as a fragment. Multiple one millisecond fragments may enable combining for purposes of link budget gain, among other examples. A responder UWB device may receive the NB packet 435 and synchronize time and/or frequency accordingly in order to properly receive the multiple UWB measurement signals 440 at time 0, time 1, time 2, and so forth. In some cases, the UWB measurement signals 440 may be measured for purposes of a ranging process. The measurement of the UWB fragments using UWB connectivity may be referred to as Phase II or Phase 2. In some cases, the responder UWB device may transmit a measurement report to the initiator UWB device, indicating the measurement performed during Phase II. The measurement report may be transmitted using the same RF connectivity as Phase I (e.g., the same NB connectivity used to transmit the NB packet 435). In some cases, transmitting the measurement report may be referred to as Phase III or Phase 3.

In some cases, an NB technology used to transmit the NB packet 435 may be associated with an Unlicensed National Information Infrastructure (UNIT) radio band, such as a UNII-3 band (e.g., a band associated with a frequency range of 5.725 to 5.850 GHz and a bandwidth of 125 MHz) or another UNIT band (e.g., UNII-5 (5.925 to 6.425 GHz frequency range and 500 MHz bandwidth), UNII-6 (6.425 to 6.525 GHz frequency range and 100 MHz bandwidth), UNII-7 (6.525 to 6.875 GHz frequency range and 350 MHz bandwidth), and/or UNII-8 (6.875 to 7.125 GHz frequency range and 250 MHz bandwidth)). Additionally, or alternatively, an NB technology used to transmit the NB packet 435 may be associated with a WLAN, Bluetooth, BLE, and/or an offset quadrature phase-shift keying (O-QPSK) technology such as Zigbee, among other examples.

In some networks, utilizing an NB technology for purposes of time and/or frequency synchronization (e.g., utilizing one of the NBA-UWB packet structures described above) may result in certain benefits as compared to the UWB packet structure, such as enabling frequency hopping and/or enabling the transmission of the initial packet (e.g., the NB packet 435) using a higher transmission power (e.g., a higher transmission power per Hz) than UWB (e.g., 14 dBm), which may be useful for purposes of range extension, among other examples. Moreover, the multiple one millisecond fragments may enable combining for purposes of link budget gain, among other examples, while using an NB technology for purposes of clock synchronization may reduce the overhead on the UWB spectrum, thus increasing transmission opportunities and improving ranging capabilities. However, NBA-UWB technologies have not yet been adapted for purposes of TWR, and thus their applications are limited.

Some techniques and apparatuses described herein enable the use of NBA-UWB technologies for purposes of TWR, enabling the transmission of the initial synchronization packet using a higher transmission power than UWB, enabling combining of multiple one millisecond fragments for purposes of link budget gain in TWR, and reducing overhead on the UWB spectrum in TWR, thus increasing transmission opportunities and improving TWR capabilities. Aspects of using NBA-UWB technologies for purposes of TWR are described below in connection with FIGS. 5-11.

As indicated above, FIG. 4 is provided as an example. Other examples may differ from what is described with regard to FIG. 4.

Figure 5:
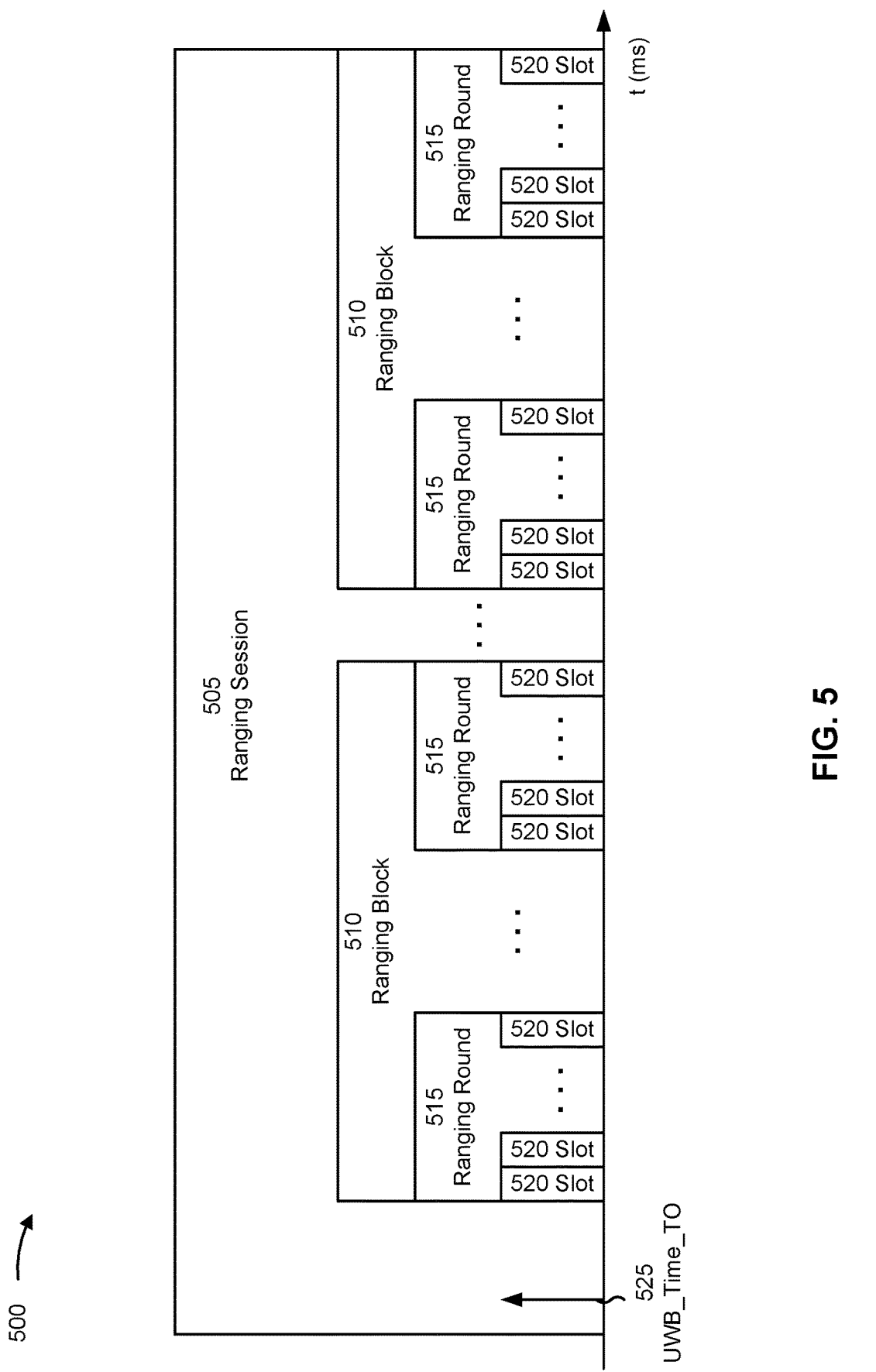
FIG. 5 shows an example of a UWB ranging session, in accordance with the present disclosure.

FIG. 5 shows an example 500 of a UWB ranging session 505, in accordance with the present disclosure. In some examples, an NB technology, such as BLE, may be used for discovery purposes and setting up the UWB ranging session 505 shown in example 500. This may include using an NB connection (e.g., BLE connectivity) to select a UWB channel to use, to configure ranging slot, round, and block durations, or the like. More particularly, in some examples, the UWB ranging session 505 may include one or more ranging blocks 510, with each ranging block 510 including one or more ranging rounds 515, and with each ranging round 515 including one or more ranging slots 520. In some examples, the UWB ranging session 505 may be configured to include one UWB measurement per ranging round 515, and/or one ranging round 515 per ranging block 510. Moreover, the ranging block 510, ranging round 515, and/or ranging slot 520 durations may be configured such that each ranging slot 520 is long enough to complete one UWB message, and such that a number of ranging slots 520 per ranging round 515 is large enough to complete one ranging measurement.

In some examples, NB connectivity may be used to synchronize a start time of the ranging session 505. For example, the NB connectivity or a component associated with NB connectivity may pass a time parameter (sometimes referred to as UWB_Time_T0, as shown at reference number 525) to the UWB connectivity or a component associated with UWB connectivity to mark the beginning of the ranging session 505. In some examples, a duration of each ranging block 510 may determine a frequency of a ranging measurement. For example, one single-sided TWR measurement may be completed per ranging block 510, and thus a shorter duration ranging block 510 may result in more frequent TWR measurements, while a longer duration ranging block 510 may result in less frequent TWR measurements. Moreover, in some examples, round hopping may be configured such that an index of a ranging round 515 changes from one ranging block 510 to the next ranging block 510. For example, when round hopping is enabled, a round index may be selected in each ranging block 510 based at least in part on a specified round-hopping function.

In some aspects described herein, a first wireless communication device (e.g., a UE or a network node) may transmit, to a second wireless communication device (e.g., a UE or a network node), a first synchronization message using a first RF technology (e.g., NB technology) and a first frequency resource. The first synchronization message may be associated with synchronization for a second RF technology (e.g., UWB technology). For example, the first synchronization message may be part of an NBA-UWB technology. The first wireless communication device may switch to a second frequency resource and then transmit a second synchronization message (also associated with synchronization for the second technology) using the first RF technology and on a second frequency resource.

In some aspects, the first wireless communication device may switch to the second frequency resource to transmit the second synchronization message based at least in part on the second synchronization message being within a slot, round, or block associated with ranging or sensing (e.g., subsequent to the first synchronization message). For example, the first wireless communication device may be configured to switch frequency resources (e.g., frequency hop) after each slot, round, or block (e.g., regardless of success of a previous synchronization message). In some aspects, the first wireless communication device may be configured (e.g., based at least in part on a previous communication and/or a communication protocol, among other examples) to switch frequency resources every ranging block (e.g., one or more rounds), every ranging round (e.g., one or more slots and a whole or partial round), or every ranging slot. In this way, the first wireless communication device may conserve computing and power resources that may have otherwise been used if the switching were conditional (e.g., conditional on failure of the first synchronization message).

In some aspects, the first wireless communication device may switch to the second frequency resource to transmit the second synchronization message based at least in part on failure of the first synchronization message. For example, failure of the first synchronization message may include failure of the second wireless communication device to receive the synchronization message, failure of the first wireless communication device to receive a reply to the first synchronization message, and/or business of a channel associated with the first frequency resource (e.g., interference and/or occupation of resources by other signaling), among other examples. In this way, the first wireless communication device may conserve network resources by not enforcing unnecessary hopping.

For example, if the first synchronization message and a reply to the first synchronization message succeed, the first wireless communication device does not apply hopping. If the first synchronization message (e.g., a first NB message) is not successfully received by the second wireless communication device, the first wireless communication device may not transmit second RF technology fragments associated with synchronization using the second RF technology and/or the first wireless communication device may switch to the second frequency resource before transmitting the second synchronization message. If the first synchronization message (e.g., a first NB message) is successfully received by the second wireless communication device but the reply (e.g., a second NB message) is not successfully received by the first wireless communication device, the first wireless communication device may not transmit second RF technology fragments associated with synchronization using the second RF technology and/or the first wireless communication device may switch to the second frequency resource before transmitting the second synchronization message. For example, the first wireless communication device may wait for a next block, round, or slot to transmit the second synchronization message. at the next block, round, or slot, the first wireless communication device may apply channel hopping (e.g., NB channel hopping) and retransmit the first synchronization message until the first wireless communication device receives a reply to a successfully received synchronization message via the first RF technology.

In some aspects, frequency resources may be associated with priorities. For example, the frequency resources may be associated with different channels of the first RF technology. To reduce interference with other wireless communications (e.g., Wi-Fi), a priority channel list of the first technology (e.g., an NB priority channel list) may be defined (e.g., in UNII-3 for NBA-UWB). In the context of this application, Wi-Fi may be a term used interchangeably with IEEE 802.11 wireless communication technology.

In some aspects (e.g., if UNII-3 is used), selection of a frequency resources and/or an associated channel may involve a priority channel list. For example, the first wireless communication device may select a random channel from the priority channel list for a first attempt to transmit the synchronization message. Example priority channels may include frequency resources within 5730-5735 MHz and/or frequency resources within 5725-5730 MHz (e.g., part of Ch #144). If the first synchronization message succeeds, the wireless communication device may remain in the same frequency channel (e.g., using the first frequency resource).

If the first synchronization fails (e.g., failure of the second wireless communication device to receive the synchronization message and/or failure of the first wireless communication device to receive the reply to the first synchronization message), the first wireless communication device may switch to a non-priority channel list to select the second frequency resource for transmission of the second synchronization message. If the second synchronization message fails, the first wireless communication device may select a third frequency resource (e.g., the same or different from the first frequency resource) to transmit a third synchronization message. In this configuration, the first wireless communication device may use non-priority channel only if transmission via prioritized channels fail.

In some aspects, a distance in a frequency domain between the first frequency resource and the second frequency resource may satisfy a minimum frequency hopping distance. For example, the minimum frequency hopping distance may be used to avoid interference and to improve channel diversity in the first RF technology.

In some aspects, the minimum frequency hopping distance may be based at least in part on a minimum distance to achieve diversity in the first RF technology (e.g., at least 5 MHz spacing). In some aspects, the minimum frequency hopping distance may be based at least in part on a minimum distance to reduce a likelihood of interference from signals of a third RF technology (e.g., Wi-Fi), such as a bandwidth of a channel of the third RF technology (e.g., at least 20 MHz spacing). In some aspects, the distance in the frequency domain between the first frequency resource and the second frequency resource may be selected using a pseudo-random number generator (e.g., AES or LFSR) to assist in selection of frequency resources (e.g., with a parameter of the minimum frequency hopping distance).

In some aspects, the first wireless communication device may use a function (e.g., a recursive function) to select a next frequency resource for transmitting a synchronization message via the first RF technology. For example:

$$NB_{CH}(n+1) = NB_{CH}(n) + d(n)$$

where a hopping distance is $d(n) = r(n) + B \mod M$ (where M is total number of channels in the unblocked list), B is a fixed gap (in terms of channel number) to ensure minimum frequency hopping distance, $r(n)$ is an output of a pseudo-random number generator such as LFSR or AES-128, and N represents the time index.

In some aspects, the minimum frequency hopping distance may be based at least in part on an equation for a channel list of the third RF technology (e.g., a Wi-Fi Channel list). Based at least in part on failure of the first synchronization message, the first wireless communication device may generate a random number using a pseudo-random number generator and then check if adding the random number to the first frequency resource would keep the second frequency resource within a same frequency channel of the third RF technology as the first frequency resource. If the second frequency resource would be in the same frequency channel of the third RF technology, the second frequency resource is invalid and the first wireless communication device attempts again to select the second frequency resource until the second frequency resource is outside of the same frequency channel of the third RF technology.

Based at least in part on using a minimum frequency hopping distance, a subsequent synchronization message may be transmitted outside of a channel bandwidth of a third RF technology (e.g., Wi-Fi) and the subsequent synch message may avoid interference with the third RF technology.

Figure 6:
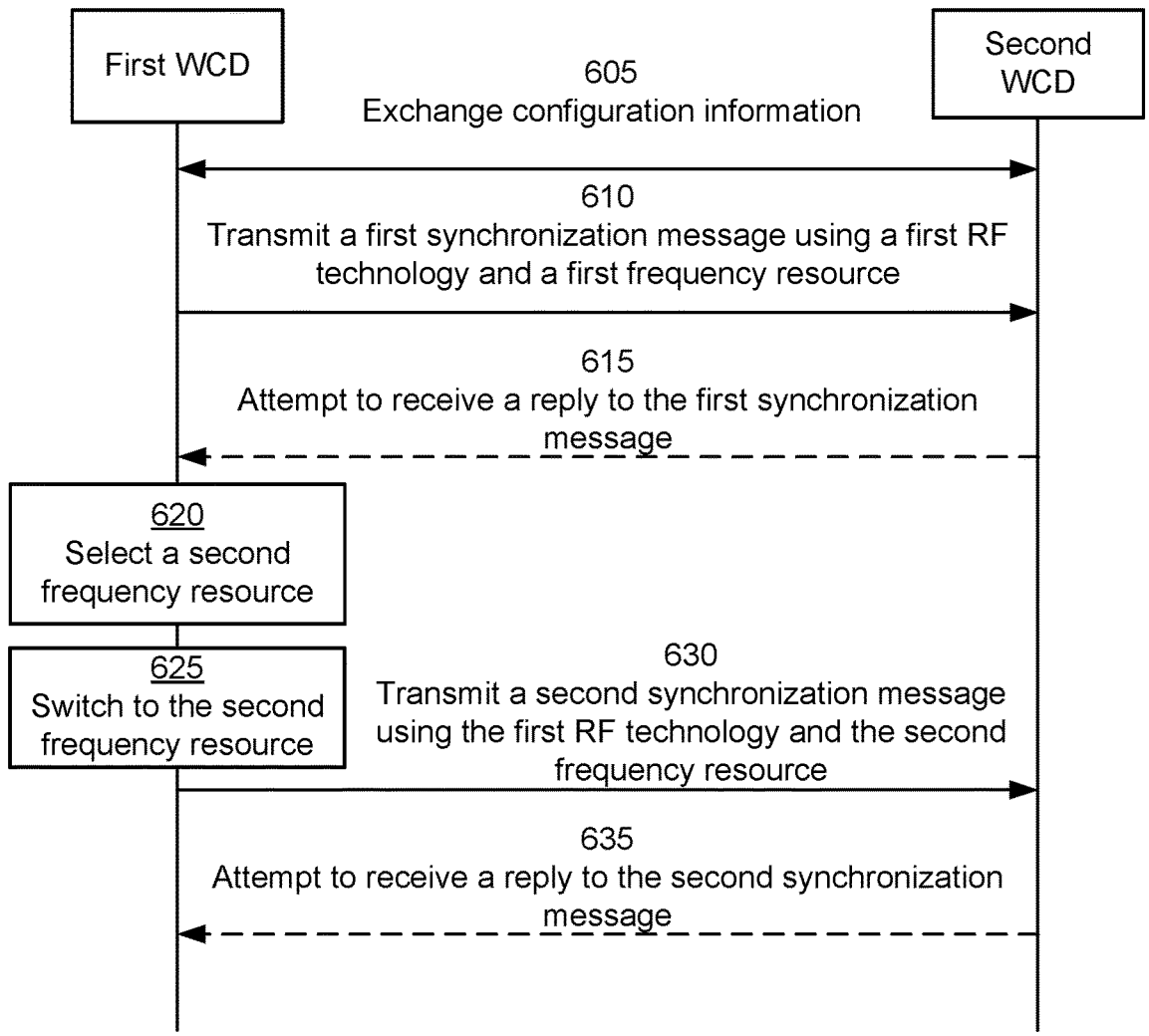
FIG. 6 is a diagram of an example associated with narrowband assisted ultrawideband frequency hopping, in accordance with the present disclosure.

FIG. 6 is a diagram of an example 600 associated with narrowband assisted ultrawideband frequency hopping, in accordance with the present disclosure. As shown in FIG. 6, a first wireless communication device (WCD) (e.g., UE 120, network node 110, a CU, a DU, and/or an RU) may transmit signals with a second wireless communication device (e.g., UE 120, network node 110, a CU, a DU, and/or an RU). In some aspects, the first wireless communication device and the second wireless communication device may be part of a wireless network (e.g., wireless network 100) that uses a first RF technology (e.g., NB for assisting UWB) and/or a second RF technology (e.g., UWB).

As shown by reference number 605, the first wireless communication device and the second wireless communication device may exchange configuration information. In some aspects, the first wireless communication device may transmit one or more portions of the configuration information to the second wireless communication device. In some aspects, the second wireless communication device may transmit one or more portions of the configuration information to the first wireless communication device. In some aspects, the first wireless communication device and the second wireless communication device may exchange the configuration information using a sidelink communication channel, a Uu communication channel, or an indirect communication channel (e.g., a communication that is routed through another deice), among other examples.

In some aspects, the configuration information may indicate a pseudo-random number generator, a starting position of the pseudo-random number generator, and/or a key for using the pseudo-random number generator to generate a hopping distance and/or one or more other parameters for selecting frequency resources for transmitting a synchronization message via the first RF technology (e.g., NB technology). In some aspects, the configuration information may indicate a minimum frequency hopping distance, or one or more parameters for deriving the minimum frequency hopping distance, to use when switching between a first frequency resource and a second frequency resource for transmitting a second synchronization message.

The first wireless communication device and the second wireless communication device may configure themselves based at least in part on the configuration information. In some aspects, the first wireless communication device and the second wireless communication device may be configured to perform one or more operations described herein based at least in part on the configuration information.

As shown by reference number 610, the first wireless communication device may transmit, and the second wireless communication device may attempt to receive, a first synchronization message using a first RF technology (e.g., NB technology) and a first frequency resource. In some aspects, the first synchronization message is associated with synchronization for a second RF technology (e.g., UWB). In some aspects, the first synchronization message may be included in a control message and/or may include control information.

In some aspects, the first wireless communication device may transmit the first synchronization message using the first frequency resource based at least in part on a priority of the first frequency resource. For example, the first wireless communication device may transmit the first synchronization message using the first frequency resource based at least in part on a priority of the first frequency resource and/or a priority of another frequency resource (e.g., a lower priority or a non-priority frequency resource) for frequency selection and/or hopping using the first RF technology for synchronization for the second RF technology.

As shown by reference number 615, the first wireless communication device may attempt to receive, and the second wireless communication device may receive, a reply to the first synchronization message. For example, the second wireless communication device may transmit the reply to the first synchronization message based at least in part on successfully receiving the first synchronization message.

As shown by reference number 620, the first wireless communication device may select a second frequency resource. For example, the first wireless communication device may select the second frequency resource based at least in part on failure of the first synchronization message and/or based at least in part on beginning a new time-domain resource (e.g., a slot, a round, or a block, among other examples). In some aspects, the first wireless communication device may select the second frequency resource only if the first synchronization message failed. In some aspects, the first wireless communication device may select the second frequency resource based at least in part on beginning a new time-domain resource (e.g., regardless of whether the first synchronization message failed). In some aspects, the first wireless communication device may select the second frequency resource only if the first synchronization message failed, and may wait until a subsequent time-domain resource begins.

In some aspects, the first wireless communication device may select the second frequency resource for transmitting the second synchronization message based at least in part on a priority of the first frequency resource and/or a priority of the second frequency resource, within a list of priority frequency resources, for frequency hopping using the first RF technology for synchronization for the second RF technology. For example, the first frequency resource may be a prioritized frequency resource and the second frequency resource may be a non-prioritized frequency resource, so the wireless communication device first attempts to transmit the first synchronization message on the first frequency resource and then attempts to transmit the second message on the second frequency resource after failure on the first frequency resource.

Alternatively, the second frequency resource may be a prioritized frequency resource, the first frequency resource may be a non-prioritized frequency resource, and transmission of the first synchronization message on the first frequency resource is based at least in part on a failure of a prior synchronization message on an additional prioritized frequency resource (e.g., the same as the second frequency resource or a different prioritized frequency resource). In this example, the wireless communication device may return to a prioritized frequency resource (e.g., the second frequency resource) after failure on the non-prioritized frequency resource.

In some aspects, the priority of the first frequency resource or the priority of the second frequency resource is based at least in part on a likelihood of interference from wireless signaling of a third RF technology. For example, the first frequency resource or the second frequency resource may have a priority that is based at least in part on a likelihood that signals (e.g., from another RF technology, such as Wi-Fi) may interfere with the frequency resources. In particular, frequency resources that are located outside of a channel of the third RF resources may be prioritized frequency resources.

In some aspects, the first wireless communication device may select the second frequency resource based at least in part on a minimum frequency hopping distance, a pseudo-random additional frequency hopping distance, or a modulo operation (e.g., to avoid selecting frequency resources that are outside of an available spectrum of the first RF technology). In some aspects, the minimum frequency hopping distance is based at least in part on a minimum frequency diversity distance associated with a width of the first frequency resource and/or minimum interference distance associated with a channel resource width of a third RF technology (e.g., Wi-Fi).

In some aspects, the first wireless communication device may select the second frequency based at least in part on generating a first random number as a provisional frequency hopping distance from the first frequency resource, with a provisional value of the second frequency resource is based at least in part on the first frequency resource and the provisional frequency hopping distance (e.g., adding or subtracting the hopping distance from the first frequency resource). The first wireless communication device may determine whether the provisional value of the second frequency resource is within a same frequency channel of a third RF technology (e.g., Wi-fi) and/or whether the second frequency resource satisfies the minimum frequency hopping distance. In some aspects, the first wireless communication device may generate a second random number as a replacement for the first random number based at least in part on the provisional value of the second frequency resource being within the same frequency channel of the third RF technology and/or failing to satisfy the minimum frequency hopping distance from the first frequency resource.

As shown by reference number 625, the first wireless communication device may switch to the second frequency resource. For example, the first wireless communication device may configure a transmission chain for transmission using the second frequency resource and/or may tune to the second frequency resource.

In some aspects, the second wireless communication device may perform parallel operations to those described in connection with reference numbers 620 and/or 625 to determine the second frequency resource to the second wireless communication device can receive the second synchronization message.

As shown by reference number 630, the first wireless communication device may transmit, and the second wireless communication device may receive, a second synchronization message using the first RF technology and the second frequency resource. In some aspects, the first wireless communication device may transmit the second wireless communication device message after switching to the second frequency resource (e.g., different from the first frequency resource). The second synchronization message may also be associated with synchronization for the second RF technology.

In some aspects, the first wireless communication device may transmit the second synchronization message using the second frequency resource based at least in part on transmission of the second synchronization message being within (e.g., having time resource within) a subsequent slot, a subsequent round, or a subsequent block from the first synchronization message. In some aspects, the first wireless communication device and the second wireless communication device may agree on whether to switch frequency resource after each slot, each round, or each block.

In some aspects, the first wireless communication device may transmit the second synchronization message using the second frequency resource based at least in part on failure of the first synchronization message or failure of a reply, from the second wireless communication device, to the first synchronization message. For example, the first wireless communication device may switch to the second frequency resource occurs only if the first synchronization message or the reply to the first synchronization message fails. Additionally, or alternatively, the first wireless communication device and the second wireless communication device may agree on switching occasions (e.g., when the wireless communication device may switch frequency resources based at least in part on failure of a previous synchronization message) after each slot, each round, or each block.

As shown by reference number 635, the second wireless communication device may transmit, and the first wireless communication device may attempt to receive, the reply to the second synchronization message. For example, the second wireless communication device may transmit the reply to the second synchronization message based at least in part on successfully receiving the second synchronization message.

Based at least in part on the first synchronization message or the second synchronization message being successful, the first wireless communication device may transmit, to the second wireless communication device, one or more additional synchronization messages using the second technology (e.g., UWB). For example, the first wireless communication device may transmit the preamble 420, the SFD 425, and/or the UWB measurement signal 440 to the second wireless communication device.

Based at least in part on using a minimum frequency hopping distance, a subsequent synchronization message may be transmitted outside of a channel bandwidth of a third RF technology (e.g., Wi-Fi) and the subsequent synch message may avoid interference with the third RF technology. Additionally, or alternatively, based at least in part on switching frequency resources after every block, round, or slot, the first wireless communication device and the second wireless communication device may conserve power and/or computing resources that may otherwise be used to determine whether to switch frequency resources. Alternatively, switching only after failure of a previous synchronization message may conserve network resources that may have otherwise been used to switch frequency resources after every block, round, or slot.

As indicated above, FIG. 6 is provided as an example. Other examples may differ from what is described with respect to FIG. 6.

Figure 7:
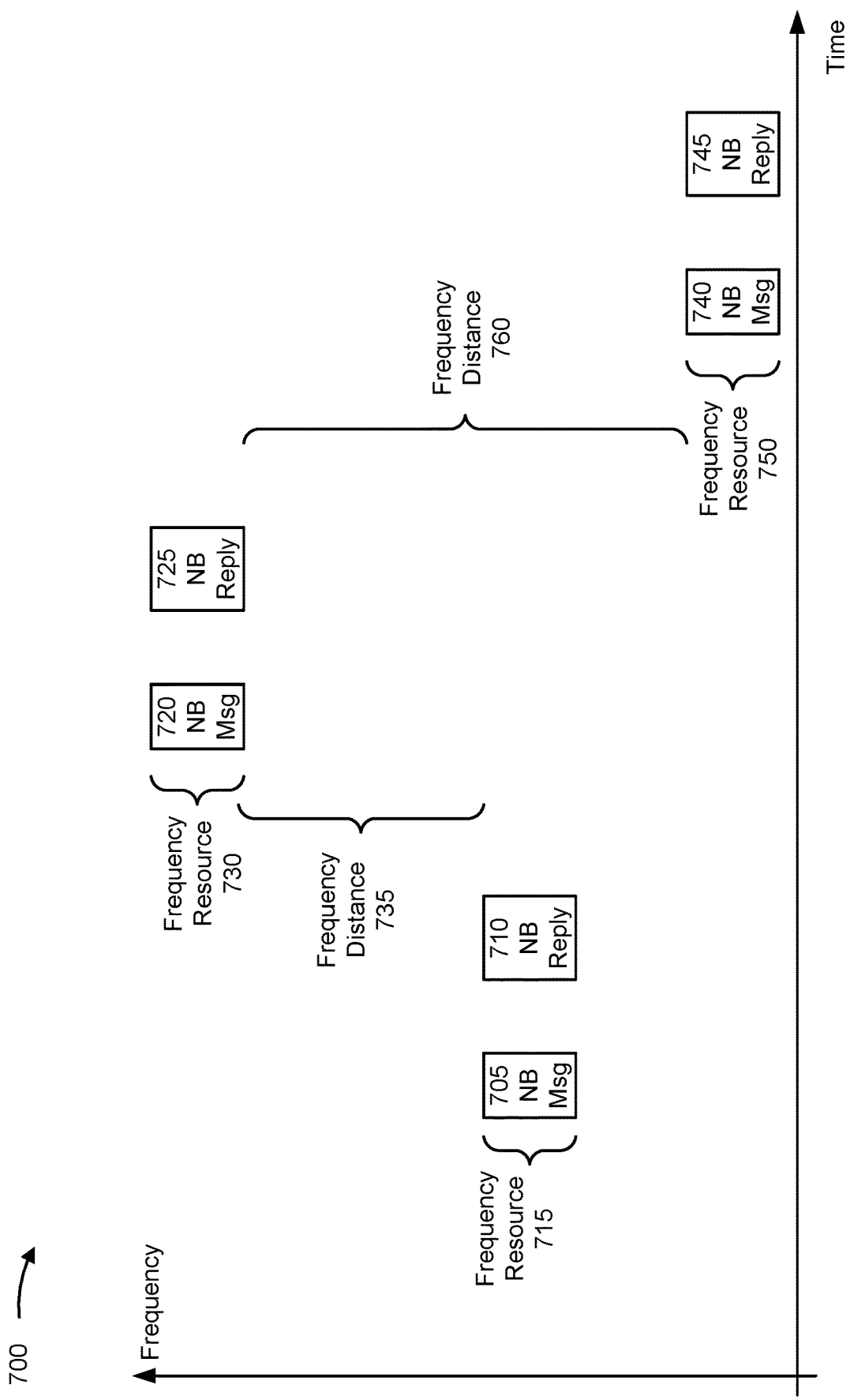
FIG. 7 is a diagram of an example associated with narrowband assisted ultrawideband frequency hopping, in accordance with the present disclosure.

FIG. 7 is a diagram of an example 700 associated with narrowband assisted ultrawideband frequency hopping, in accordance with the present disclosure. As shown in FIG. 7, a first wireless communication device (e.g., UE 120, network node 110, a CU, a DU, and/or an RU) may transmit signals with a second wireless communication device (e.g., UE 120, network node 110, a CU, a DU, and/or an RU). In some aspects, the first wireless communication device and the second wireless communication device may be part of a wireless network (e.g., wireless network 100) that uses a first RF technology (e.g., NB for assisting UWB) and/or a second RF technology (e.g., UWB).

As shown in FIG. 7, a first wireless communication device may transmit, and a second wireless communication device may attempt to receive, an NB message (Msg) 705. The second wireless communication device may transmit, and the first wireless communication device may attempt to receive, an NB reply 710. The NB message 705 and the NB reply 710 may be communicated using a frequency resource 715.

In some aspects, the first wireless communication device may determine to hop (e.g., away from the frequency resource 715) to a new frequency resource. For example, the first wireless communication device may determine to hop to a new frequency resource based at least in part on failure of the NB message 705 and/or the NB reply 710. In some aspects, the first wireless communication device may determine to hop to a new frequency resource based at least in part on beginning a new time domain resource (e.g., a slot, a round, and/or a block).

As further shown in FIG. 7, the first wireless communication device may transmit, and the second wireless communication device may attempt to receive, an NB message 720. The second wireless communication device may transmit, and the first wireless communication device may attempt to receive, an NB reply 725. The NB message 720 and the NB reply 725 may be communicated using a frequency resource 730. The frequency resource 730 may have a frequency distance 735 from the frequency resource 715. In some aspects, the frequency distance may be selected based at least in part on satisfaction of a minimum frequency hopping distance as described herein.

In some aspects, the first wireless communication device may determine to hop (e.g., away from the frequency resource 730) to a new frequency resource. For example, the first wireless communication device may determine to hop to a new frequency resource based at least in part on failure of the NB message 720 and/or the NB reply 725. In some aspects, the first wireless communication device may determine to hop to a new frequency resource based at least in part on beginning a new time domain resource.

As further shown in FIG. 7, the first wireless communication device may transmit, and the second wireless communication device may attempt to receive, an NB message 740. The second wireless communication device may transmit, and the first wireless communication device may attempt to receive, an NB reply 745. The NB message 740 and the NB reply 745 may be communicated using a frequency resource 750. The frequency resource 755 may have a frequency distance 760 from the frequency resource 730. In some aspects, the frequency distance may be selected based at least in part on satisfaction of a minimum frequency hopping distance as described herein. In some aspects, the frequency resource 755 may be the same as the frequency resource 715.

As indicated above, FIG. 7 is provided as an example. Other examples may differ from what is described with respect to FIG. 7.

Figure 8:
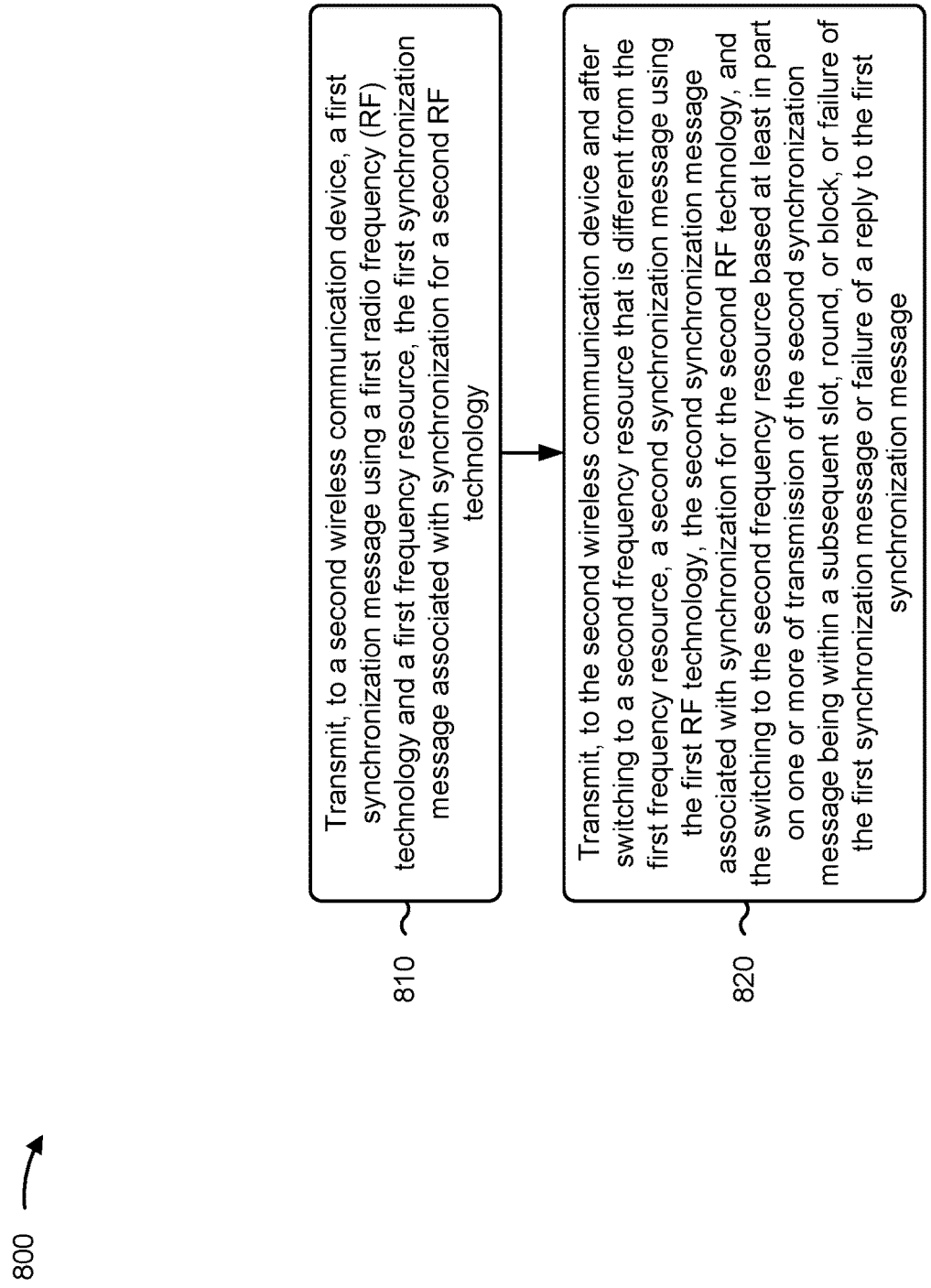
FIG. 8 is a diagram illustrating an example process performed, for example, by a first wireless communication device, in accordance with the present disclosure.

FIG. 8 is a diagram illustrating an example process 800 performed, for example, by a first wireless communication device, in accordance with the present disclosure. Example process 800 is an example where the first wireless communication device (e.g., UE 120 or network node 110) performs operations associated with narrowband assisted ultrawideband frequency hopping.

As shown in FIG. 8, in some aspects, process 800 may include transmitting, to a second wireless communication device, a first synchronization message using a first RF technology and a first frequency resource, the first synchronization message associated with synchronization for a second RF technology (block 810). For example, the first wireless communication device (e.g., using communication manager 140 or 150 and/or transmission component 904, depicted in FIG. 9) may transmit, to a second wireless communication device, a first synchronization message using a first RF technology and a first frequency resource, the first synchronization message associated with synchronization for a second RF technology, as described above.

As further shown in FIG. 8, in some aspects, process 800 may include transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of: transmission of the second synchronization message being within a slot, round, or block associated with ranging or sensing, or failure of the first synchronization message or failure of a reply, from the second wireless communication device, to the first synchronization message (block 820). For example, the first wireless communication device (e.g., using communication manager 140 or 150 and/or transmission component 904, depicted in FIG. 9) may transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of: transmission of the second synchronization message being within a slot, round, or block associated with ranging or sensing, or failure of the first synchronization message or failure of a reply, from the second wireless communication device, to the first synchronization message, as described above.

Process 800 may include additional aspects, such as any single aspect or any combination of aspects described below and/or in connection with one or more other processes described elsewhere herein.

In a first aspect, the switching to the second frequency resource occurs only if the first synchronization message or the reply to the first synchronization message fails.

In a second aspect, alone or in combination with the first aspect, transmission of the first synchronization message using the first frequency resource and transmission of the second synchronization message using the second frequency resource is based at least in part on one or more of a priority of the first frequency resource or a priority of the second frequency resource, within a list of priority frequency resources, for frequency hopping using the first RF technology for synchronization for the second RF technology.

In a third aspect, alone or in combination with one or more of the first and second aspects, the first frequency resource is a prioritized frequency resource and the second frequency resource is a non-prioritized frequency resource, or wherein the second frequency resource is a prioritized frequency resource, the first frequency resource is a non-prioritized frequency resource, and transmission of the first synchronization message on the first frequency resource is based at least in part on a failure of a prior synchronization message on an additional prioritized frequency resource.

In a fourth aspect, alone or in combination with one or more of the first through third aspects, the priority of the first frequency resource or the priority of the second frequency resource is based at least in part on a likelihood of interference from wireless signaling of a third RF technology.

In a fifth aspect, alone or in combination with one or more of the first through fourth aspects, a frequency distance between the first frequency resource and the second frequency resource is based at least in part on one or more of a minimum frequency hopping distance, a pseudo-random additional frequency hopping distance, or a modulo operation.

In a sixth aspect, alone or in combination with one or more of the first through fifth aspects, the minimum frequency hopping distance is based at least in part on one or more of a minimum frequency diversity distance associated with a width of the first frequency resource, or a minimum interference distance associated with a channel resource width of a third RF technology.

In a seventh aspect, alone or in combination with one or more of the first through sixth aspects, process 800 includes selecting the second frequency resource based at least in part on one or more of generating a first random number as a provisional frequency hopping distance from the first frequency resource, wherein a provisional value of the second frequency resource is based at least in part on the first frequency resource and the provisional frequency hopping distance, determining whether the provisional value of the second frequency resource is within a same frequency channel of a third RF technology, or generating a second random number as a replacement for the first random number based at least in part on the provisional value of the second frequency resource being within the same frequency channel of the third RF technology.

In an eighth aspect, alone or in combination with one or more of the first through seventh aspects, the third RF technology comprises Wi-Fi technology.

In a ninth aspect, alone or in combination with one or more of the first through eighth aspects, the first RF technology comprises narrowband technology, or wherein the second RF technology comprises ultra-wideband technology.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
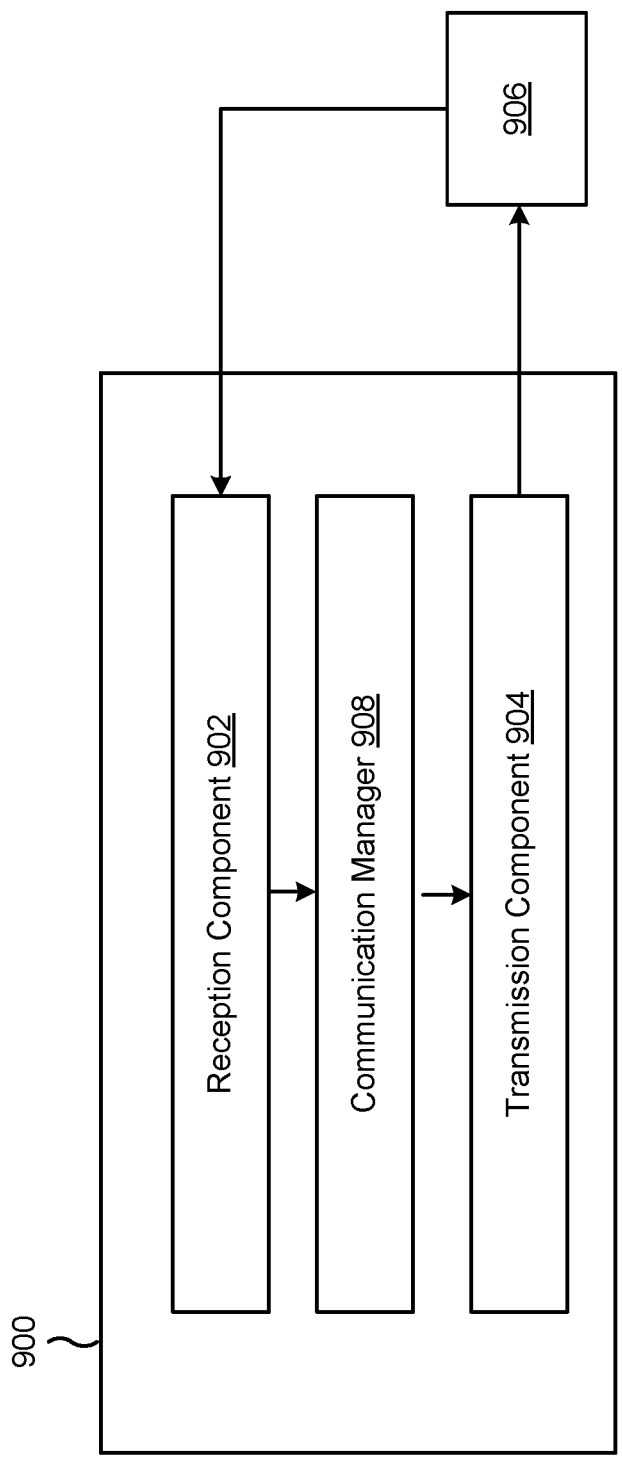
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a first wireless communication device, or a first wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140 or 150).

In some aspects, the apparatus 900 may be configured to perform one or more operations described herein in connection with FIGS. 6-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the first wireless communication device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, one or more memories, or a combination thereof, of the first wireless communication device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, one or more memories, or a combination thereof, of the first wireless communication device described in connection with FIG. 2.

In some aspects, the transmission component 904 may be co-located with the reception component 902 in a transceiver.

The transmission component 904 may transmit, to a second wireless communication device, a first synchronization message using a first RF technology and a first frequency resource, the first synchronization message associated with synchronization for a second RF technology. The transmission component 904 may transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of transmission of the second synchronization message being within a slot, round, or block associated with ranging or sensing, or failure of the first synchronization message or failure of a reply, from the second wireless communication device, to the first synchronization message.

The communication manager 908 may select the second frequency resource based at least in part on one or more of generating a first random number as a provisional frequency hopping distance from the first frequency resource, wherein a provisional value of the second frequency resource is based at least in part on the first frequency resource and the provisional frequency hopping distance, determining whether the provisional value of the second frequency resource is within a same frequency channel of a third RF technology, or generating a second random number as a replacement for the first random number based at least in part on the provisional value of the second frequency resource being within the same frequency channel of the third RF technology.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first wireless communication device, comprising: transmitting, to a second wireless communication device, a first synchronization message using a first radio frequency (RF) technology and a first frequency resource, the first synchronization message associated with synchronization for a second RF technology; and transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of: transmission of the second synchronization message being within a slot, round, or block associated with ranging or sensing, or failure of the first synchronization message or failure of a reply, from the second wireless communication device, to the first synchronization message.

Aspect 2: The method of Aspect 1, wherein the switching to the second frequency resource occurs only if the first synchronization message or the reply to the first synchronization message fails.

Aspect 3: The method of any of Aspects 1-2, wherein transmission of the first synchronization message using the first frequency resource and transmission of the second synchronization message using the second frequency resource is based at least in part on one or more of a priority of the first frequency resource or a priority of the second frequency resource, within a list of priority frequency resources, for frequency hopping using the first RF technology for synchronization for the second RF technology.

Aspect 4: The method of Aspect 3, wherein the first frequency resource is a prioritized frequency resource and the second frequency resource is a non-prioritized frequency resource, or wherein the second frequency resource is a prioritized frequency resource, the first frequency resource is a non-prioritized frequency resource, and transmission of the first synchronization message on the first frequency resource is based at least in part on a failure of a prior synchronization message on an additional prioritized frequency resource.

Aspect 5: The method of any of Aspects 3-4, wherein the priority of the first frequency resource or the priority of the second frequency resource is based at least in part on a likelihood of interference from wireless signaling of a third RF technology.

Aspect 6: The method of any of Aspects 1-5, wherein a frequency distance between the first frequency resource and the second frequency resource is based at least in part on one or more of: a minimum frequency hopping distance, a pseudo-random additional frequency hopping distance, or a modulo operation.

Aspect 7: The method of Aspect 6, wherein the minimum frequency hopping distance is based at least in part on one or more of: a minimum frequency diversity distance associated with a width of the first frequency resource, or a minimum interference distance associated with a channel resource width of a third RF technology.

Aspect 8: The method of any of Aspects 1-7, further comprising selecting the second frequency resource based at least in part on one or more of: generating a first random number as a provisional frequency hopping distance from the first frequency resource, wherein a provisional value of the second frequency resource is based at least in part on the first frequency resource and the provisional frequency hopping distance, determining whether the provisional value of the second frequency resource is within a same frequency channel of a third RF technology, or generating a second random number as a replacement for the first random number based at least in part on the provisional value of the second frequency resource being within the same frequency channel of the third RF technology.

Aspect 9: The method of Aspect 8, wherein the third RF technology comprises Wi-Fi technology.

Aspect 10: The method of any of Aspects 1-9, wherein the first RF technology comprises narrowband technology, or wherein the second RF technology comprises ultra-wideband technology.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising one or more memories and one or more processors coupled to the memory, the one or more processors, individually or collectively, configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the examples to the precise forms disclosed. Modifications and variations may be made in light of the above disclosure or may be acquired from practice of the examples.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, among other examples.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
   one or more memories; and
   one or more processors, coupled to the memory, individually or collectively configured to:
   transmit, to a second wireless communication device, a first synchronization message using a first radio frequency (RF) technology and a first frequency resource, the first synchronization message associated with synchronization for a second RF technology;
   transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of:
      transmission of the second synchronization message being within a subsequent slot, round, or block associated with ranging or sensing, or
      failure of the first synchronization message or failure of a reply, from the second wireless communication device, to the first synchronization message;
   wherein transmission of the first synchronization message using the first frequency resource and transmission of the second synchronization message using the second frequency resource is based at least in part on one or more of a priority of the first frequency resource or a priority of the second frequency resource, within a list of priority frequency resources, for frequency hopping using the first RF technology for synchronization for the second RF technology; and wherein the first frequency resource is a prioritized frequency resource and the second frequency resource is a non-prioritized frequency resource, or wherein the second frequency resource is a prioritized frequency resource, the first frequency resource is a non-prioritized frequency resource, and transmission of the first synchronization message on the first frequency resource is based at least in part on a failure of a prior synchronization message on an additional prioritized frequency resource.

2. The first wireless communication device of claim 1, wherein the switching to the second frequency resource occurs only if the first synchronization message or the reply to the first synchronization message fails.

3. The first wireless communication device of claim 1, wherein the priority of the first frequency resource or the priority of the second frequency resource is based at least in part on a likelihood of interference from wireless signaling of a third RF technology.

4. The first wireless communication device of claim 3, wherein the third RF technology comprises Wi-Fi technology.

5. The first wireless communication device of claim 1, wherein a frequency distance between the first frequency resource and the second frequency resource is based at least in part on one or more of:
  a minimum frequency hopping distance,
  a pseudo-random additional frequency hopping distance, or
  a modulo operation.

6. The first wireless communication device of claim 5, wherein the minimum frequency hopping distance is based at least in part on one or more of:
  a minimum frequency diversity distance associated with a width of the first frequency resource, or
  a minimum interference distance associated with a channel resource width of a third RF technology.

7. The first wireless communication device of claim 1, wherein the first RF technology comprises narrowband technology, or
  wherein the second RF technology comprises ultra-wideband technology.

8. A method of wireless communication performed by a first wireless communication device, comprising:
  transmitting, to a second wireless communication device, a first synchronization message using a first radio frequency (RF) technology and a first frequency resource, the first synchronization message associated with synchronization for a second RF technology;
  transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of:
    transmission of the second synchronization message being within a subsequent slot, round, or block associated with ranging or sensing, or
    failure of the first synchronization message or failure of a reply, from the second wireless communication device, to the first synchronization message;
  wherein transmission of the first synchronization message using the first frequency resource and transmission of the second synchronization message using the second frequency resource is based at least in part on one or more of a priority of the first frequency resource or a priority of the second frequency resource, within a list of priority frequency resources, for frequency hopping using the first RF technology for synchronization for the second RF technology; and
  wherein the first frequency resource is a prioritized frequency resource and the second frequency resource is a non-prioritized frequency resource, or
  wherein the second frequency resource is a prioritized frequency resource, the first frequency resource is a non-prioritized frequency resource, and transmission of the first synchronization message on the first frequency resource is based at least in part on a failure of a prior synchronization message on an additional prioritized frequency resource.

9. The method of claim 8, wherein the switching to the second frequency resource occurs only if the first synchronization message or the reply to the first synchronization message fails.

10. The method of claim 8, wherein the priority of the first frequency resource or the priority of the second frequency resource is based at least in part on a likelihood of interference from wireless signaling of a third RF technology.

11. The method of claim 10, wherein the third RF technology comprises Wi-Fi technology.

12. The method of claim 8, wherein a frequency distance between the first frequency resource and the second frequency resource is based at least in part on one or more of:
  a minimum frequency hopping distance,
  a pseudo-random additional frequency hopping distance, or
  a modulo operation.

13. The method of claim 12, wherein the minimum frequency hopping distance is based at least in part on one or more of:
  a minimum frequency diversity distance associated with a width of the first frequency resource, or
  a minimum interference distance associated with a channel resource width of a third RF technology.

14. The method of claim 8, further comprising selecting the second frequency resource based at least in part on one or more of:
  generating a first random number as a provisional frequency hopping distance from the first frequency resource, wherein a provisional value of the second frequency resource is based at least in part on the first frequency resource and the provisional frequency hopping distance,
  determining whether the provisional value of the second frequency resource is within a same frequency channel of a third RF technology, or
  generating a second random number as a replacement for the first random number based at least in part on the provisional value of the second frequency resource being within the same frequency channel of the third RF technology.

15. The method of claim 14, wherein the third RF technology comprises Wi-Fi technology.

16. The method of claim 8, wherein the first RF technology comprises narrowband technology, or
  wherein the second RF technology comprises ultra-wideband technology.

17. A first wireless communication device for wireless communication, comprising:
one or more memories; and
one or more processors, coupled to the memory, individually or collectively configured to:
transmit, to a second wireless communication device, a first synchronization message using a first radio frequency (RF) technology and a first frequency resource, the first synchronization message associated with synchronization for a second RF technology;
transmit, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of:
transmission of the second synchronization message being within a subsequent slot, round, or block associated with ranging or sensing, or
failure of the first synchronization message or failure of a reply, from the second wireless communication device, to the first synchronization message;
wherein the one or more processors are further configured, individually or collectively, to select the second frequency resource based at least in part on one or more of: determination of whether the provisional value of the second frequency resource is within a same frequency channel of a third RF technology, or
generation of a second random number as a replacement for the first random number based at least in part on the provisional value of the second frequency resource being within the same frequency channel of the third RF technology; and
wherein the third RF technology comprises Wi-Fi technology.

18. An apparatus for wireless communication, comprising:
means for transmitting, to a second wireless communication device, a first synchronization message using a first radio frequency (RF) technology and a first frequency resource, the first synchronization message associated with synchronization for a second RF technology;
means for transmitting, to the second wireless communication device and after switching to a second frequency resource that is different from the first frequency resource, a second synchronization message using the first RF technology, the second synchronization message associated with synchronization for the second RF technology, and the switching to the second frequency resource based at least in part on one or more of:
transmission of the second synchronization message being within a subsequent slot, round, or block associated with ranging or sensing, or
failure of the first synchronization message or failure of a reply, from the second wireless communication device, to the first synchronization message;
wherein transmission of the first synchronization message using the first frequency resource and transmission of the second synchronization message using the second frequency resource is based at least in part on one or more of a priority of the first frequency resource or a priority of the second frequency resource, within a list of priority frequency resources, for frequency hopping using the first RF technology for synchronization for the second RF technology; and
wherein the first frequency resource is a prioritized frequency resource and the second frequency resource is a non-prioritized frequency resource, or
wherein the second frequency resource is a prioritized frequency resource, the first frequency resource is a non-prioritized frequency resource, and transmission of the first synchronization message on the first frequency resource is based at least in part on a failure of a prior synchronization message on an additional prioritized frequency resource.

19. The apparatus of claim 18, wherein the switching to the second frequency resource occurs only if the first synchronization message or the reply to the first synchronization message fails.

20. The apparatus of claim 18, wherein a frequency distance between the first frequency resource and the second frequency resource is based at least in part on one or more of:
a minimum frequency hopping distance,
a pseudo-random additional frequency hopping distance, or
a modulo operation.

* * * * *